United States Patent [19]

Karlsson

[11] Patent Number: 4,747,560
[45] Date of Patent: May 31, 1988

[54] FISHING REEL WITH LEVEL WING

[75] Inventor: Jarding U. Karlsson, Mörrum, Sweden

[73] Assignee: ABU Garcia Produktion AB, Svängsta, Sweden

[21] Appl. No.: 24,512

[22] Filed: Mar. 11, 1987

[30] Foreign Application Priority Data

Mar. 13, 1986 [SE] Sweden .............................. 8601168-1

[51] Int. Cl.[4] ...................... A01K 89/015; A01K 89/04
[52] U.S. Cl. .................................. 242/84.42; 242/84.4; 242/211
[58] Field of Search ................. 242/84.4, 84.41, 84.42, 242/84.43, 84.21 R, 211-216

[56] References Cited

U.S. PATENT DOCUMENTS

| | | | |
|---|---|---|---|
| 2,673,043 | 3/1954 | Verbeke | 242/84.42 |
| 4,226,384 | 10/1980 | Karlsson | 242/84.42 |
| 4,666,101 | 5/1987 | Atobe | 242/84.42 |

FOREIGN PATENT DOCUMENTS

40-21220  9/1965  Japan .................................. 242/84.42

*Primary Examiner*—John Petrakes
*Attorney, Agent, or Firm*—Browdy and Neimark

[57] ABSTRACT

A fishing reel comprising a line spool which for winding up a fishing line is rotatable by means of a manually operable crank and disconnectable from a gear transmission by means of a disconnectable clutch and a clutch operating member. The reel also comprises a line spreading mechanism with an involute screw which is rotatable by means of the crank via the gear transmission for reciprocating a screw follower connected to reciprocate a line guide and which, when winding up the line, serves as a line spreading member for spreading the fishing line on the line spool. The line spreading member comprises a hub slidably mounted on a guiding sleeve. An involute screw is rotatably mounted in the sleeve and defines, together therewith, an annular space in which an annular support for the screw follower and for a driver dog is mounted. The annular support which encompasses the involute screw and is guided in sliding contact with the inner periphery of the sleeve, forms together with the screw follower and the driver dog a unit which is reciprocable within and encapsulated by the sleeve with the sole exception that a dog pin which is supported by the driver dog and disengageable by angular movement extends with an end portion through a longitudinal guiding slot in the wall of the sleeve for guiding the annular screw follower support.

6 Claims, 4 Drawing Sheets

FISHING REEL WITH LEVEL WING

BACKGROUND OF THE INVENTION

This invention relates to a fishing reel of the kind which comprises a line spreading mechanism including a rotatable involute screw in disconnectable driving engagement with a line spreading member which is reciprocable by means of the involute screw for spreading a fishing line evenly along a line spool, when the fishing line is wound up thereon.

For spreading the fishing line evenly along the line spool, when the fishing line is wound up thereon after casting, fishing reels of this kind are equipped with a line spreading mechanism constructed to work according to either of two main principles.

Most common is a construction wherein the line spreading mechanism comprises a line spreading member consisting of a pair of spaced apart parallel arms which form a line guide and are connected at their tops and fixed at their base ends to a common support. The support also supports a screw follower which always is in engagement with the endless thread of a rotatable involute screw. When, upon casting, the fishing line runs out and rotates the line spool, the latter drives the line spreading mechanism via a transmission connected to the involute screw, which means that this mechanism, mainly because the reciprocable line spreading member is being driven via the involute screw and the transmission, restrains the free rotation of the line spool.

A more complicated and expensive construction operating according to the other of the main principles mentioned above, is characterised in that the two arms of the line spreading member are separable from each other at their outer and inner ends and are disconnectable from the involute screw thread by means of a disconnecting device, whereupon the two arms are moved apart by spring means and parked in positions adjacent opposite end walls of the fishing reel frame, in which positions they are not reciprocated by the line spool via the involute screw.

In spite of the fact that the second principle discussed above is wholly sound, fishing reels having a line spreading mechanism of this type suffer from several shortcomings and have not met with unreserved success due to malfunction in the complicated assembly of a plurality of cooperating elements.

Therefore, in order to make the function more reliable, it has been proposed to use two separate guides instead of a single guide for the line spreading member, such as one guide for guiding a support for the separable line spreading arms and another guide for guiding a separate support for the screw follower bolt which makes it necessary to provide a disconnectable coupling between these separate supports. This introduces a further mechanical complication, and in addition there is a greater risk of an irretrievable entanglement of the fishing line if the latter, for example when the line spool rotates at higher speed than the out-running speed of the fishing line during a cast, is caught between the relatively reciprocating supports.

BRIEF DESCRIPTION OF THE INVENTION

The invention provides a fishing reel which comprises a frame and, supported by the frame, a line spool which is rotatable in one direction for winding up a fishing line thereon and is rotatable in the opposite direction by a pulling force acting on the fishing line, such as during casting; a line spreading mechanism which includes a cylindrical guiding sleeve angularly movably mounted in the frame and having a longitudinal guiding slot formed in the wall thereof, a line spreading member having an outer end portion formed to serve as a line guide, and an inner end portion formed to serve as a hub for slidingly supporting said member on said sleeve, a rotatable involute screw mounted within said sleeve and defining therewith an annular space, and a screw follower having one end formed for and positioned in engagement with the endless thread of the involute screw for reciprocating said line spreading member along said sleeve; said fishing reel further comprising a driving mechanism including a manually operable crank and transmission means connected to said crank and to said involute screw and disconnectable clutching means and clutch actuating means for connecting said line spool to said transmission means and for connecting said line spreading member to said involute screw to permit the line spool to be rotated in said one direction for winding up the fishing line and to permit the line spreading member to be reciprocated simultaneously with the rotation of the line spool in said one direction for spreading the fishing line in a predetermined manner along the line spool, when said disconnectable clutching means are in engagement, and to permit free rotation of the line spool in said opposite direction and movement of the line spreading member out of engagement with the involute screw when said clutching means are disengaged; wherein said line spreading mechanism for transmitting reciprocating movement from said screw follower to said line spreading member comprises an annular screw follower support which is mounted in said annular space in said sleeve in encompassing relationship with said involute screw and in sliding contact with the inner periphery of said sleeve, said involute screw being mounted in the wall of said annular support and projecting with said end thereof into engagement with said involute screw, said support and said screw follower being reciprocable as a unit along the involute screw and being encapsulated in and shielded by said sleeve; wherein a driver dog is supported by said annular support and comprises a dog pin, which extends through and is guided by said slot in said sleeve for guiding the annular support in the sleeve and which is in operative position and projects with an end portion out of said slot; and wherein said hub comprises engagement means for receiving said end portion of the dog pin in mutual engagement therewith for transmitting the reciprocating movement of the annular support and the screw follower to said line spreading member.

Thus, a principal object of this invention is to overcome at least some of the drawbacks discussed above and to exploit the advantages the constructions according to the second principle described above were meant to give, especially easy rotation of the line spool and running-out of the fishing line, during a cast.

Another object is to solve a problem which arises when the fish makes a run after having taken the bait. To this end, a mechanism is provided which, when the fishing line is pulled out by the fish and rotates the line spool due to slippage in a friction brake and in spite of the fact that the crank is held stationery or rotated by the angular, disengages the line spreading member automatically and thus permits running-out of the fishing line and unobstructed transversal movements thereof back and forth along the line spool, in accordance with the spiral turns of the fishing line thereon, whereby transversal braking forces from the line spreading members on the fishing line are avoided.

The objects and advantages of the present invention will be readily understood from the following description of a nonexclusive example of a fishing reel when studied in connection with the accompanying drawings in which:

DETAILED DESCRIPTION OF THE INVENTION

Figure 1:
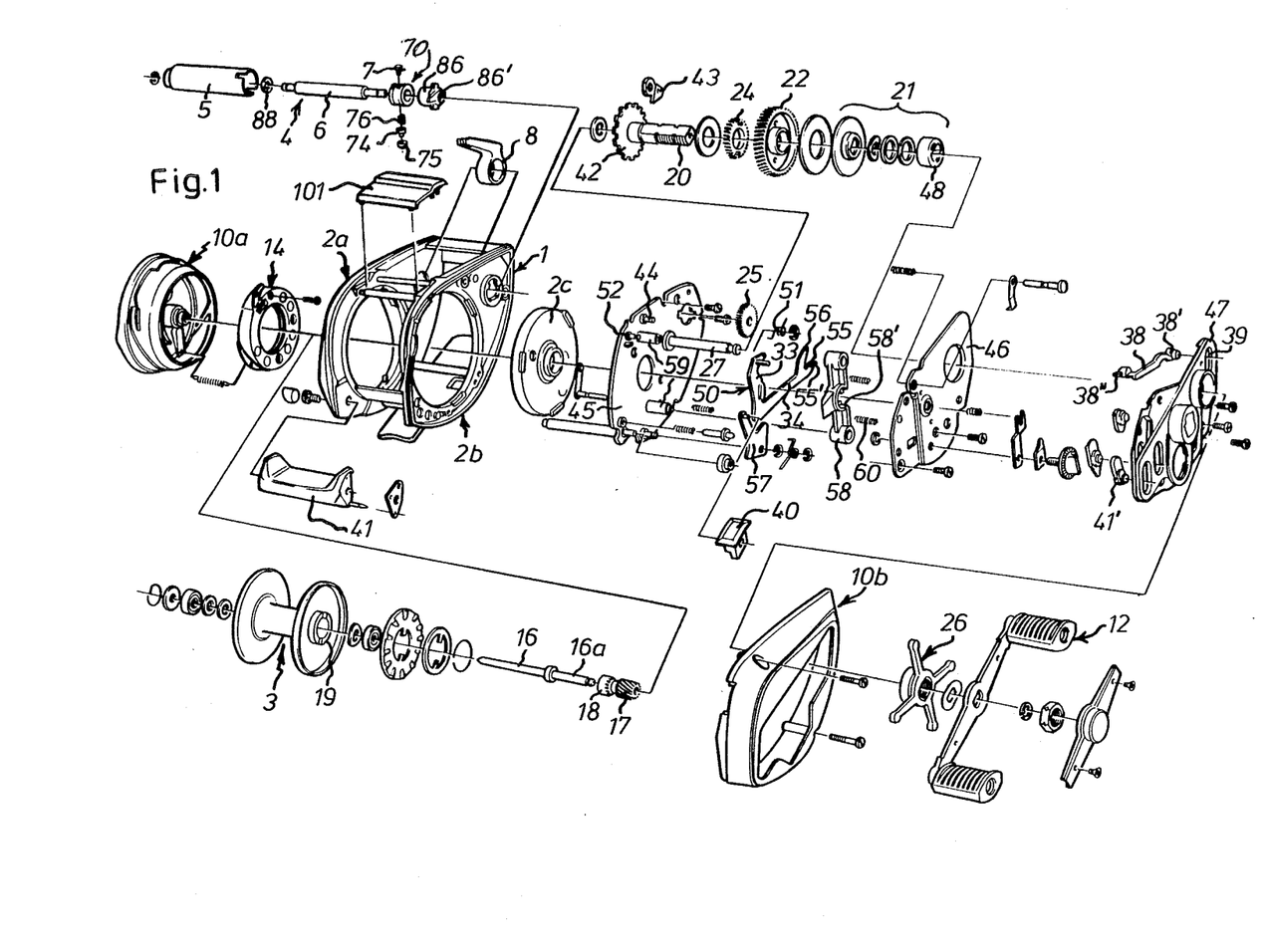
FIG. 1 shows, in an exploded view, all components of an exemplifying fishing reel equipped with a line spreading mechanism according to the invention.

With reference to the drawings, there are shown in FIG. 1, in an exploded view, all components of a fishing reel which includes a line spreading mechanism of the new construction according to the invention.

The fishing reel comprises a frame in the form of a cage 1 having opposite end walls 2a, 2b wherein openings are formed to permit insertion of a line spool 3 therein as well as an opening for inserting a guide sleeve 5 which forms part of the line spreading mechanism 4 which, besides the guiding sleeve 5, comprises an involute screw 6, a screw follower 7 and a line guide which is reciprocable by means of the screw follower and serves as a line spreading member 8. This mechanism will be described in detail after a brief description of the other components of the fishing reel.

The cage 1 has a foot for mounting the reel on a fishing rod in conventional manner and the end walls 2a, 2b of the cage 1 comprise means for permitting easy detachable mounting of a pair of end caps 10a, 10b thereon. When connected to each other, these caps and the cage form together a housing for several components of the fishing reel and as a support for a hand-operated crank 12 adjacent the outer side of the cap 10b.

The cap 10a forms a casing for a known magnetic brake 14 and is formed as a bayonet socket for engagement in the opening of the end wall 2a of the cage 1, also in known manner. A line spool shaft 16 is insertable in ball bearings which are fixed in the hub of the line spool, and the rear end portion 16a of the shaft 16 in FIG. 1 is formed to receive a worm screw 17 which is formed integrally with a clutching member 18. The latter faces the line spool and is slidable as a unit together with the worm screw 17 into and out of engagement with a mating clutch member 19 supported on the facing end wall of the line spool 3.

The line spool and the involute screw are rotatable by means of the crank 12 via a driving mechanism which includes a tubular drive shaft 20, an adjustable friction brake 21, separate first and second gear transmissions and separate first and second clutches. The first clutch consists of the clutching members 18, 19 described above, whereas the second clutch consists of cooperating means for disengageably connecting the involute screw follower 7 to the line spreading member 8, as will be described below in connection with a detailed description of the line spreading mechanism shown in FIGS. 2-6.

The first gear transmission consists of the worm screw 17 described above and a gear wheel 22 which, when the transmission components shown in FIG. 1 are assembled in the intended relative positions, is rotatably mounted on the drive shaft 20 in engagement with the worm screw 17, and the second gear transmission consists of a gear wheel 24 which is rotatably mounted on the drive shaft 20 adjacent and fixed, such as by means of driving pins, to the gear wheel 22 of the first transmission, and a gear wheel 25 which is detachably fixed to the rear end of the involute screw 6 in FIG. 1 and is in engagement with the gear wheel 24 of the second gear transmission. The involute screw 6 may be considered as part of the second gear transmission between the drive shaft and the screw follower driven thereby.

As mentioned above, the adjacent gear wheels 22, 24 are fixed to each other and rotatably mounted on the drive shaft 20, but rotary movement of the gear wheels 22, 24 in relation to the drive shaft is restrictable at will by means of the friction brake 21 which is adjustable by means of a wing nut 26 mounted on a threaded end portion of the drive shaft and acting via a set of thrust washers on a friction washer mounted axially and rotatably movable on the drive shaft in cooperating contact with a friction surface supported by the gear wheel 22. By means of the wing nut, the friction washer and the gear wheels 22, 24 on the drive shaft may be compressed between the thrust washers and an abutment consisting of a friction disk and a ratchet wheel 42 fixed to the inner end of the drive shaft.

In operative positions of the fishing reel components shown in FIG. 1, a first mounting plate 45 is fixed by means of screws to the rear end wall 2b of the cage 1 in abutment with a detachable disk 2c which covers the opening for the line spool in the cage end wall 2b. A second mounting plate 46 is fixed to the first mounting plate 45 in spaced relationship therewith by means of spacers and screws, and to the second mounting plate there is fixed an end plate 47 which is positioned within and embraced by the ring-shaped rear end cap 10b to form a complementary bottom wall therein. This bottom wall 47 is provided with openings for receiving and guiding operating knobs for a plurality of functions known in the art as "flipping", "fast cast", "line alarm", "anti-reverse", and for spool balance adjustment.

The tubular drive shaft 20 is rotatably mounted on a cylindrical spindle 27 which is fixed at one end thereof to the mounting plate 45 and extends parallel to and radially spaced from the line spool shaft 16 through coaxial openings provided in the plates 46 and 47. The spindle and the shaft are axially fixed to each other by means of a snap ring at their outer ends, which extends through an opening in the end plate 47 wherein the shaft 20 is journalled in a gland 48 which is non-rotatably but slidably supported on a shaft end portion. This end portion is provided with opposite flattened surfaces in engagement with mating surfaces in the gland, and with threads for engagement with the wing nut 26. The wing nut is positioned adjacent the outer side of the end plate 47 in abutment with the gland which serves as a thrust ring in cooperation with the thrust washers mentioned. The drive shaft 20 supports the friction brake 21, the gear wheels 22, 24 and the ratchet wheel 42 in the space between the mounting plates 45, 46, and the line spool shaft 16 extends into the space mentioned above through coaxial openings in the cover disc 2c and in the first mounting plate 45 and supports the worm screw 17 in engagement with the gear wheel 22.

The first clutch 18, 19 between the first transmission 22, 17 and the line spool 3 and the second clutch, which acts between the line spreading member 4 and the involute screw follower 7, are simultaneously disengageable by means of an operating mechanism which includes a push-button 40, an operating key 41 and the crank 12. One of the members forming the push-button and the key may be omitted. The operating key can be locked in clutch disengaging position by means of the "fast cast" knob mentioned above and designated 41' in FIG. 1.

The ratchet wheel 42 is nonrotatably fixed to the drive shaft to be rotated thereby, and cooperates with a pawl 43 pivotally mounted on a pivot pin 44 which may serve as a pivot pin also for a pawl disengaging and reengaging arm 38. This arm has one end thereof formed as a socket for receiving the top end of the pivot pin 44 and supports at the other end the "anti-reverse" knob 38' which is mentioned above and extends through and is guided by a circular slot 39 in the end plate 47. The socket at the inner end of the arm 38 supports a projection 38" for moving the pawl 43 out of engagement with the ratchet wheel 42, when the "anti-reverse" knob is moved from one end to the other in the guiding slot 39.

The ratchet wheel 42 forms part of a connecting and disconnecting mechanism which will now be described.

As a common link for transmitting operating forces from the operating members described above, i.e. the key 41, the push-button 40 and the crank 12, serves a fork-shaped bell crank 50 which is slidably supported on the mounting plate 45 and is movable against and under the action of a return spring 51. The return spring is supported on a pin 52 fixed to the mounting plate 45 and comprises a bent end portion which forms a pivot pin for and is pivotally connected to one end of the bell crank 50. Mounted in place, the push-button 40 is pivotally connected directly to one 33 of a pair of angularly spaced bell crank arms 33, 34, while the key 41 is arranged to operate the bell crank via a lever 57 which is pivotally mounted on a pivot pin supported by the mounting plate 45.

An operating member 58 in the form of a yoke is slidably mounted on and guided by a pair of parallel cylindrical studs 59 which are supported on the mounting plate 45 and extend through openings formed in the outer end portions of the yoke. The yoke 58 is supported in contact with a cam surface formed on the base portion of the yoke.

The central portion of the yoke is substantially semicircular and comprises a semicircular edge 58' for embracing a waist portion of the integral body which comprises the worm screw 17 and the clutching member 18 shown in FIG. 1.

The yoke 58 is biased in the direction of the bell crank 50 by elastic means, such as springs 59 mounted between the yoke and the rear mounting plate 46 in FIG. 1, and is guided by means of studs 60, such that the center of the semicircular edge 58' is positioned on an axis aligned with the longitudinal axis of the spool shaft 16.

When the bell crank is actuated by means of the push-button 40, or by means of the operating key 41, against the action of the return spring 51, a ramp portion of the cam surface on the bell crank is moved into sliding contact with a facing cam surface supported by the yoke and pushes the yoke in the direction of the rear mounting plate 46 and thus against the action of the return springs 60. The yoke will thereby move the unit consisting of the worm screw 17 and the clutching member 18 along the outer end portion of the line spool shaft in a direction away from the spool, whereby the clutching member 18 is moved out of engagement with the clutching member 19 fixed to the line spool. During this movement, the worm screw is maintained in engagement with the gear wheel 22.

When the bell crank 50 is operated for effecting the clutch disengaging operation described above, a first prong 55 of a fork-shaped outer end portion of the bell crank arm 34 is moved in the direction of the ratchet wheel 42 and introduces a hook portion 55' thereof into the space between a pair of adjacent teeth of the ratchet wheel. When the pawl 43 is in its operative position, the ratchet wheel is rotatable only in one direction which corresponds to the direction in which the prong 55 moves the hook into engagement with the ratchet wheel, whereby the prong 55 can turn the ratchet wheel in a sufficient degree to secure an effective mutually locked engagement between the bell crank and the ratchet wheel until the latter is rotated by means of the crank. When the crank is operated for winding-up the fishing line on the line spool, the bell crank will be pivoted, by means of the ratchet wheel, out of engagement with the latter, whereupon the clutch operating mechanism will return to its initial position.

The moment the first prong 55 is moved into locking engagement with the ratchet wheel, a second prong 56 of the bell crank arm 54 is moved into contact with and rotates an element which is fixed in relation to the guiding sleeve 5, whereby the sleeve is rotated for initiating the disengagement of the driving connection between the line spreading member and the involute screw follower, in the manner now described.

Figure 2:
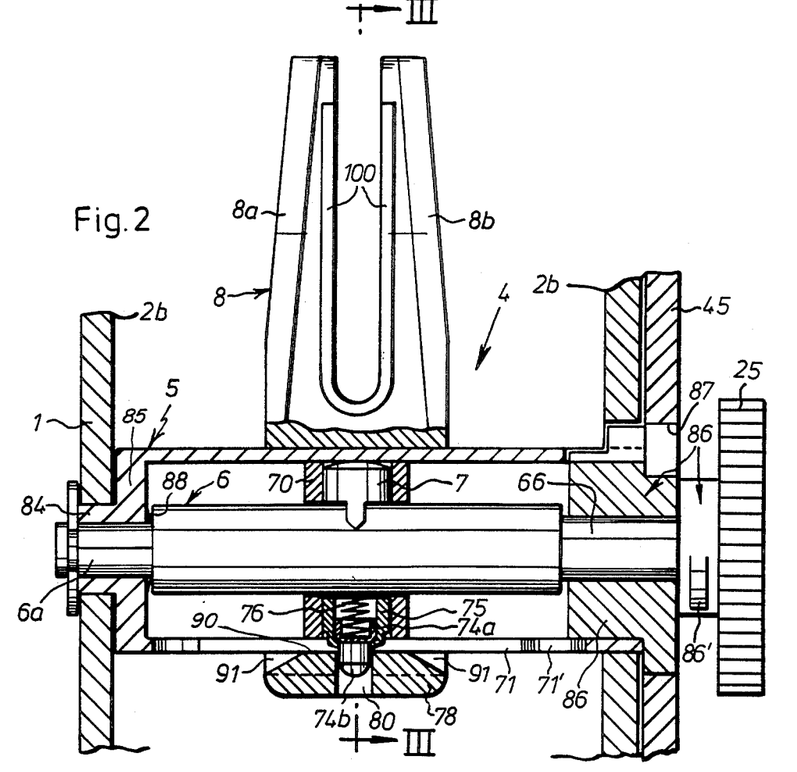
FIG. 2 is a fragmentary sectional view of the fishing reel, taken in a vertical plane parallel to the involute screw and showing in detail the essential components of the line spreading mechanism.
Figures 3, 4:
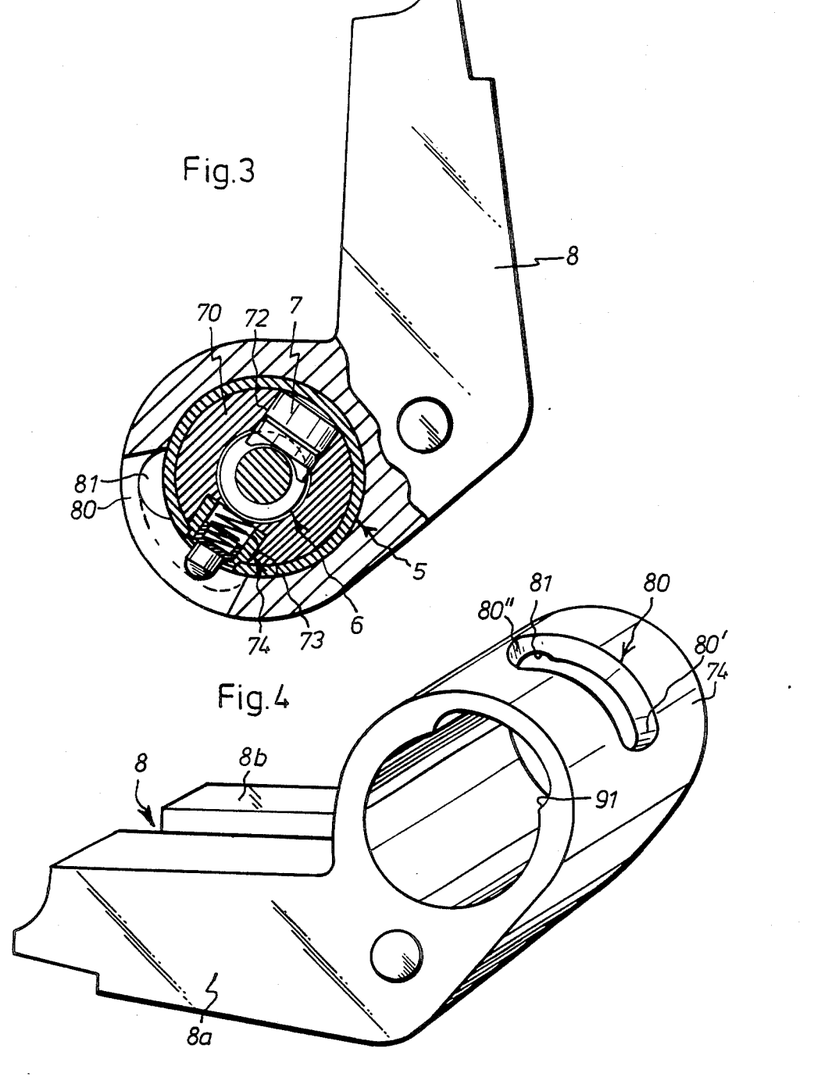
FIG. 3 is a cross-sectional view of the line spreading mechanism, taken along line III—III in FIG. 2.
FIG. 4 is a perspective view of the line spreading member shown in FIGS. 2 and 3.
Figure 5:
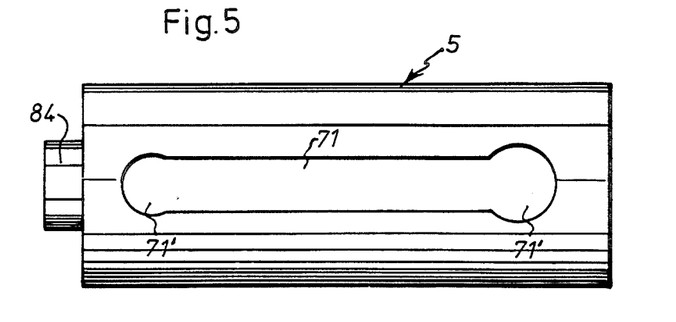
FIG. 5 is a plan view of the guide sleeve as seen from below in FIG. 2.
Figure 6:
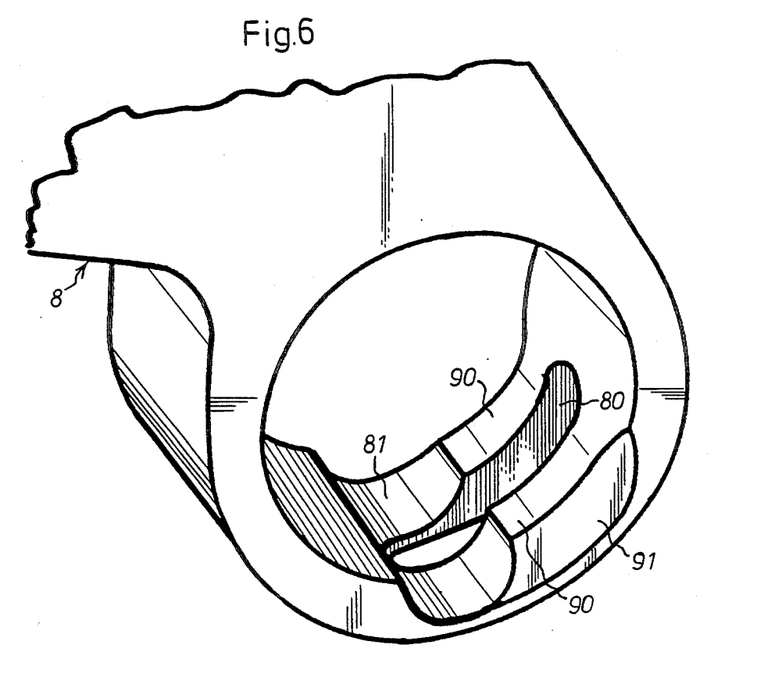
FIG. 6 is a fragmentary perspective view of the hub of the line spreading member, and showing the disconnecting groove and the curvature of the ramp surface on the inner side of the hub.

According to the invention, and as seen in FIGS. 2 and 3, the screw follower 7 is mounted in a radial bore 72 in an annular support 70 having cylindrical outer and inner peripheral surfaces and mounted together with the screw follower totally encapsulated by the slotted guide sleeve 5. The screw follower support 70 is slidably mounted in the sleeve and guided by contact with the inner periphery thereof and surrounds the involute screw. The screw follower which projects into engagement with the involute screw, is positioned angularly spaced from a longitudinal guiding slot 71 formed in the cylindrical wall of the sleeve 5.

The screw follower 7 is in the form of a bolt having a chisel-formed edge, which engages the involute screw 6, whereby the involute screw, when it is rotated, will reciprocate the cylindrical screw follower support 70 along the involute screw.

In the screw follower support 70, a radial blind bore 73 is formed in a position which is preferably angularly spaced, and most preferably diametrical, in relation to the open-ended bore 72 which receives the screw follower 7. A driver dog 74 which comprises a cylindrical sleeve-shaped base portion 74a and a projecting dog pin 74b, is slidably mounted in a cylindrical bushing 75 mounted in the blind bore 73, wherein there is also mounted a biasing spring 76. The spring 76 is compressed between the bottom of the blind bore 73 and an abutment in the sleeve-shaped base portion 74a of the driver dog 74. The biasing spring tends to move the dog pin outwardly to an outer end position in which the outer edge of the base portion of the dog pin abuts a shoulder at the outer end of the bushing 75. As shown in FIG. 2, a reduced outer end portion of the bushing 75 abuts opposite wall portions of the guiding sleeve 5 at either side of the slot 71 therein. The dog pin which is yieldingly biased by means of the spring 76, projects from the screw follower support through and outwardly from the slot 71 and into engagement with the line spreading member.

The line spreading member 8 of the line spreading mechanism 4 comprises, according to the invention, a base portion in the form of a hub 78 which is slidably mounted on the guiding sleeve 5, in relation to which the line spreading member is guided and reciprocable by means of the driver dog 74. To this end, the dog pin is in engagement with the hub 78, and this engagement is disengageable in the manner described below.

The means permitting disengageable driving connection of the dog pin with the hub 78 is, on the one hand, an opening 80 formed in the hub wall and a groove 81 formed on the inner peripheral surface of the hub and, on the other hand, the spring-biased slidable mounting of the driver dog in the screw follower support 70, which permits the dog pin to be pushed backwardly into the blind bore against the action of the spring 76 out of engagement with the hub and, when this is required, for dismounting and remounting purposes, such as through widened end portions 71' of the slot 71 in the guiding sleeve 5.

As clearly shown in FIG. 4, the opening 80 through the wall of the hub 78 is in the form of a transversal slot, the longitudinal axis of which extends perpendicularly to the geometrical axis of the hub as well as to the common geometrical axis of the guide sleeve 5 and the reciprocable unit formed by the screw follower support 70, the screw follower 7 and the driver dog 74.

According to the invention, this unit 7/70/74 is, with the exception of the top of the dog pin, mounted enclosed within and shielded by the guiding sleeve 5. In the embodiment shown in FIGS. 2 and 3, the screw follower 7 and the driver dog 74 are mounted in diametrical positions in the reciprocable support 70. These positions are preferred because, in this manner, the screw follower support 70 will be satisfactorily balanced, but neither a diametrical nor an angularly spaced position is an absolute requirement. Thus, the dog and the screw follower may be mounted in a common bore in one side of the annular support, and in such a case the biasing spring may be mounted between these two members, one of which may receive and support the other one in a telescopic arrangement with the biasing spring mounted therebetween.

The involute screw 6 supports at its ends stub shafts 6a, 6b, one 6a of which is journalled in a tubular end projection 84 of an end wall 85 of the sleeve 5, while the other stub shaft 6b is journalled in a gland 86, which is in the form of a tubular plug which is inserted and nonrotatably fixed in the open rear end of the guiding sleeve, i.e. in the opposite end of the sleeve in relation to the closed end thereof. The end projection 84 of the sleeve end wall 85 is rotatably mounted in an opening in the adjacent cage end wall 2a and is axially locked by means of a locking ring. However, the sleeve 5 is rotatable only a fraction of a full turn in that the angular movement of the gland 8 is restricted by mean of angularly spaced abutments in the opening 87 in the adjacent end wall 2b of the cage 1.

When the involute screw is rotated, it tends, simultaneously as it will reciprocate the screw follower support 70, to rotate the sleeve via the annular screw follower support and the dog pin which extends through the slot 71 in the sleeve wall. In order to avoid an unintended or overly free rotation of the sleeve, it is preferred to use a frictional damping, such as the friction in the bearing surfaces between the sleeve and the openings in the end walls 2a, 2b, or some other friction means, for example a friction washer 88 mounted on one of the stub shafts 6a, 6b of the involute screw between a radial shoulder at the one end of the sleeve and the adjacent end wall 85a of the sleeve 5.

The stub shaft 6b which is journalled in the gland 86, extends therethrough into the space between the mounting plates 45, 46, where this stub shaft supports the gear wheel 25 in engagement with the gear wheel 24, which is shown in FIG. 1 and forms a part of the gear transmission for the line spreading mechanism 4.

When the involute screw 6 is rotated by means of the crank 12, the torque between the involute screw and the screw follower 7 tends to rotate the screw follower support 70 in a direction to bring the dog pin into contact with one end 80, hereinafter referred to as the front end, of the transversal slot 80 in the hub 78, and by engagement of the dog pin with the walls of the hub at either side of the transversal slot 80, the line spreading member 8 is forced to follow the reciprocating movement of the screw follower and the screw follower support, whereby the line spreading member moves the fishing line back and forth along the line spool. By appropriate gear ratios in the synchronised first and second gear transmissions and an appropriate pitch and length of the involute screw, the fishing line will be evenly spread along the line spool when it is wound up thereon.

In case the clutch 18, 19 between the line spool and the first gear transmission is in a engaged position and a force, such as from a fish, tends to pull out the fishing line, such pulling-out is possible, when the force acting on the fishing line exceeds the slipping force set in the friction brake 21. However, the friction brake does not "feel" the transversal forces from the fishing line on the reciprocating line spreading member, and the true force on the fishing line may exceed the tensile strength of the line without any warning from the friction brake. Therefore, in the preferred embodiment shown in FIGS. 2–6, the second clutch according to the invention is constructed to permit not only disengaging and reengaging simultaneously with the disengagement and reengagement, respectively, of the first clutch described above, but also automatic disengagement, before the transversal force between the fishing line and the line spreading member reaches the critical level.

To permit disengagement and reengagement of the driving connection between the dog pin and the hub, the groove 81 formed in the cylindrical periphery of the hub 78 extends axially from one end to the other of the hub and is intersected in the intermediate portion thereof by the rear end portion of the transversal slot in the hub. In the preferred embodiment, this groove has a continuously curved profile and is sufficiently wide and deep to receive the projecting top portion of the dog pin.

At opposite ends, the cylindrical inner surface of the hub is chamfered along a sector of the circumference of the hub, wherein the slot 80 is formed. Each of these chamfered surfaces is smoothly curved to meet the full thickness of the hub wall at an axial distance from the slot 80 to leave a small ridge 90 between the chamfered portion in this sector and the slot 80. The chamfer 91 at each end of the inner peripheral surface of the hub will, together with the guiding sleeve 5, when the hub is mounted thereon, define an outwardly flaring entrance for the rounded top end of the dog pin.

As mentioned above, the second clutching means, that is the spring-biased dog pin 74b and the transversal slot 80 in the hub 78 of the line spreading member 8, is engageable and disengageable by means of the operating devices which are used for engaging and disengaging the first clutch 18, 19.

Thus, when a cast is to be effected, the push-button 40, or the key 41, is depressed, whereby the first clutch 18, 19 is operated in the manner described above, whereupon the line spool 3 is freely rotatable by means of the fishing line during the cast. When the bell crank 50 is moved in the direction for operating the yoke 58 and in the direction of the ratchet wheel 42 to bring the prong 55 of the bell crank 54 and the ratchet wheel to mutual locking engagement, the other prong 56 of this arm is moved into contact with a cam surface 86' formed on the gland 86 which is fixed to and extends from the rear end of the guiding sleeve 5 into the space between the mounting plates 45, 46 in FIG. 1. By pressure from the prong 56 on the cam surface 86', the guiding sleeve 5 and the screw follower support which, via the driver dog pin 74b, is guided by the slot 71 in the sleeve 5, are rotated to such an extent that the dog pin is moved from the driving position 80' thereof in the front end portion of the transversal slot 80 in the hub 78 to a position in the rear end position 80" of the slot 80, where the projecting top portion of the dog pin is free to be moved into the groove 81 in the hub 80. The line spreading member is reciprocated along the guiding sleeve 5 by means of the fishing line which, when running out during a cast, also rotates the freely rotatable line spool and is transversally moved back and forth along the line spool because it is helically wound thereon. The gear transmission 5 which includes the involute screw and the screw follower, are stopped by the engagement between the bell crank and the ratchet wheel, but the line spreading member is reciprocated by means of the fishing line. The relative contact between the groove in the hub and the rounded top of the dog pin which is stopped by means of the involute screw, is relatively frictionless.

When the clutch operating mechanism described above is operated by means of the crank 12, and the clutching components are returned to their initial positions, the involute screw starts to reciprocate the involute screw follower, whereby the combination of bearing friction between the involute screw and the guiding sleeve and friction between the fishing line and the line guiding surfaces of the line spreading member will return the guiding sleeve and the hub into their initial relative positions in which the dog pin will be returned into driving engagement in the front end portion of the slot in the hub 78.

In case the dog pin and the hub are axially separated from each other when the operation for winding-up the fishing line on the line spool starts, the transversal movement of the annular support 90 will automatically provide reengagement in that the support will be introduced in the hub at an end position thereof in contact with an abutment, such as one of the cage end walls 2a, 2b. By an appropriate position of such abutment and appropriate axial length of the hub in relation to the stroke of the annular support, the dog pin will slide on the chamfered surface 91 described above and be pushed backwardly in the blind bore against the action of the biasing spring, whereby the dog pin can be moved over the ridge 90 between the groove and the chamfer and be received in the slot 80.

Automatic disconnection of the line spreading member 8 occurs when a pulling force in the fishing line brings about a transversally directed force between the fishing line and the line spreading member 8, when the fishing line is wound up on the line spool, in case a pulling force on the fishing line exceeds a predetermined point, when the crank is rotated for winding up the fishing line on the line spool. When the reciprocating line spreading member then is forced to bend the line, the force of reaction in the line spreading mechanism will turn the guiding sleeve to a position in which the dog pin is received by the groove 81. In this manner, the connection between the dog pin and the hub 78 is cancelled, and the fishing line will not be subjected to any force from the line spreading member In the preferred embodiment shown in FIGS. 1 and 2, the line spreading member is in the form of a fork which comprises a pair of parallel line guiding arms 8a, 8b provided with antifriction surfaces 100 at the facing inner sides thereof. The space between the arms for receiving the fishing line is closed at the outer ends of the arms by means of a cover plate 101 which is formed to be detachably connected to the cage 1 at the upper side thereof. The cover plate is formed with a guiding groove to receive and guide the top ends of the arms. The detachable cover plate 101 may be opened to facilitate introduction of a fishing line in the line guide between the arms and may be opened also for passage of means fixed at the end of a fishing line for connecting the latter to a fishing tackle.

As will be evident from the above description and the accompanying drawings, the invention provides a fishing reel having a line spool and a line spreading member which may be simultaneously disconnected from their drives by means of a common operating member and which will be reconnected automatically by means of the manually operated crank when the latter is operated for rotating the line spool; and in addition the clutching means between the line spreading member and the involute screw is disengageable automatically by a pulling force in the fishing line which exceeds a preset force in a friction brake between the crank and the drive shaft. Finally, an important advantage and a characteristic feature of the invention is that all moving parts of the mechanism between the involute screw and the line spreading member are encapsulated in an effective manner which will prevent any contact between such movable parts and the fishing line.

What I claim and desire to secure by Letters Patent is:

1. A fishing reel comprising a frame and, supported by the frame, a line spool which is rotatable in one direction for winding up a fishing line therein and is rotatable in the opposite direction by a pulling force acting on the fishing line, such as during casting; a line spreading mechanism which includes a cylindrical guiding sleeve angularly movably mounted in the frame and having a wall and a longitudinal guiding slot formed in the wall thereof, a line spreading member having an outer end portion formed to serve as a line guide, and an inner end portion formed to serve as a hub for slidingly supporting said member on said sleeve, a rotatable involute screw having an endless thread and mounted within said sleeve and defining therewith an annular space, and a screw follower having one end formed for and positioned in engagement with the endless thread of the involute screw for reciporcating said line spreading member along said sleeve; said fishing reel further comprising a driving mechanism including a manually operable crank and transmission means connected to said crank and to said involute screw and disconnectable clutching means and clutch actuating means for connecting said line spool to said transmission means and for connecting said line spreading member to said involute screw to permit the line spool to be rotated in said one direction for winding up the fishing line and to permit the line spreading member to be reciprocated simultaneously with the rotation of the line spool in said one direction for spreading the fishing line in a predetermined manner along the line spool, when said disconnectable clutching means are in engagement, and to permit free rotation of the line spool in said opposite direction and movement of the line spreading member out of engagement with the involute screw when said clutching means are disengaged; said line spreading mechanism for transmitting reciprocating movement from said screw follower to said line spreading member comprising an annular screw follower support which is mounted in said annular space in said sleeve in encompassing relationship with said involute screw and in sliding contact with the inner periphery of said sleeve, said support and said screw follower being reciprocable as a unit along the involute screw and being encapsulated in and shielded by said sleeve; driver dog supported by said annular support and comprising a biased dog pin, which extends through and is guided by said slot in said sleeve for guiding the annular support in the sleeve and which in operative position projects with an end portion out of said slot; said hub comprising engagement means for receiving said end portion of the dog pin in mutual engagement therewith for transmitting the reciprocating movement of the annular support and the screw follower to said line spreading member.

2. A fishing reel as claimed in claim 1, wherein said engagement means for receiving said end portion of said dog pin comprises a transversal slot formed in a wall of said hub and having a longitudinal axis extending perpendicularly to the axis of said hub, said transversal slot having an engaging front end portion and an opposite disengaging rear end portion, said engaging front end portion being formed to receive said outer end portion of said dog pin in said operative position thereof for permitting transmission of reciprocal movement of said annular support to said line spreading member; a groove formed in a cylindrical inner periphery of said hub, said groove extending axially between opposite ends of said hub and being intercepted by said disengaging rear end portion of said transversal slot, such that the latter is divided into a pair of axially aligned branches which are in communication with said rear end of the transversal slot and are dimensioned sufficiently wide and deep to receive said projecting end portion of said dog pin and permit free axial reciprocating movements of said line spreading member and said driver dog in relation to and out of engagement with each other; said clutch operating mechanism comprising means for effecting a simultaneous angular movement of said guiding sleeve and said screw follower support in relation to said hub for moving said dog pin from the engaging position thereof in said front end portion of said transversal slot to a disengaging position at said rear end portion thereof to permit said free reciprocating movements of the line spreading member in relation to the driver dog.

3. A fishing line as claimed in claim 2, wherein the inner periphery of said hub at the opposite ends thereof is provided with chamfered surfaces along a sector of the hub which comprises said transversal slot, said chamfered surfaces defining with said transversal slot a pair of parallel ridges and forming cam surfaces which, together with said guiding sleeve on which said hub is mounted, define outwardly flared entrances to permit said dog pin to be received therein and moved from either end of the hub via the respective ridge to said transversal slot when the screw follower support and the line spreading member are in a relative position in which the dog pin is situated axially outwardly of either one of said entrances and when the line spreading member is pressed against said screw follower support with a force sufficient to move said dog pin into a sufficiently retracted position against the action of the bias acting on the dog pin to permit the dog pin to slide over said ridge.

4. A fishing reel as claimed in claim 1, wherein said hub in its wall has a transversal slot, the longitudinal axis of which is perpendicular to the axis of said hub and which comprises opposite front and rear ends, and a disengaging groove which extends axially between the opposite ends of said hub and is divided by the rear end portion of said transversal slot into a pair of axially aligned branches which are in communication with said rear end of the transversal slot and are dimensioned sufficiently wide and deep to receive said projecting end portion of said dog pin, said dog pin being movably supported by said annular screw follower support and being yieldably biased from a retracted inner end position to an extended end position in which said end portion of the dog pin projects from said slot in said guiding sleeve into said transversal slot in the hub, said operating mechanism comprising means for moving said line spreading member and said guiding sleeve and thereby said screw follower support in relation to each other between first and second angularly spaced positions, thereby to move said extended dog pin along said transversal slot between said front and rear ends thereof, said dog pin when positioned at the front end of said transversal slot being in driving engagement with said hub for transmitting reciprocal movement from said driver dog to said line spreading member, whereas said dog pin, after being moved to the rear end of said transversal slot, permits reciprocation of said line spreading member in relation to said dog pin and thereby in relation to said screw follower support by sliding movement along said groove and thereby permits said line spreading member to be reciprocated by means of the fishing line during a cast, when the rotating line spool is disengaged from said driving mechanism and the driving mechanism is not moving.

5. A fishing reel as claimed in claim 4, wherein said hub at each end of the inner periphery thereof is provided with a chamfer in the area of the hub which comprises said transversal slot, to facilitate engagement between said screw follower support and said line spreading member by a relative axial movement thereof from a disengaged position in which said dog pin is situated axially outwardly of said transversal slot, as a result of an axial force, which is sufficient to move said dog pin to said retracted position against the biasing force thereon by means of contact pressure between said chamfer and the top of the dog pin.

6. A fishing reel as claimed in claim 1, wherein said outer end portion of said line spreading member comprises a pair of parallel arms which define a line guiding slot therebetween, said slot being open at the top ends of said arms; said frame comprising an opening formed to receive said top ends of said arms and permit transversal movements of said top ends during said reciprocal movement of the line spreading member; a cover plate is supported by and pivotally connected to said frame to cover said opening, said cover plate being formed to guide said top ends of said arms and to close said line guiding slot at the outer end thereof and being pivotally movable to an open position in which said line guiding slot is open at said outer end to permit a fishing line to be introduced in and removed from said guiding slot.

* * * * *